Dec. 3, 1929.  W. H. REX ET AL  1,738,116

COMBINED RAIL JOINT AND LOCK NUT

Filed Sept. 8, 1928

Inventors
WALTER H. REX,
FRANK P. WOODWARD,
By Townsend & Townsend
Attorneys

Patented Dec. 3, 1929

1,738,116

UNITED STATES PATENT OFFICE

WALTER H. REX AND FRANK P. WOODWARD, OF TALLAHASSEE, FLORIDA; SAID REX ASSIGNOR OF TEN PER CENT TO CARREL FOSTER, OF ATLANTA, GEORGIA

COMBINED RAIL JOINT AND LOCK NUT

Application filed September 8, 1928. Serial No. 304,812.

Our invention relates to new and useful improvements in rail joints of the type wherein the nuts employed are automatically locked in operative position.

The main object of our invention is to provide a rail joint construction wherein the assembly of the various units securely locks the fastening nuts in position and prevents reverse rotation thereof under any of the conditions encountered in normal usage.

Another object of the invention is to provide a rail joint construction that automatically locks the fastening nuts against reverse rotation when the parts are assembled without the employment of additional locking elements other than those used in assembling the joint.

A still further object of the invention is to provide a rail joint of the conventional type that employs a novel type of angle bars and nuts which automatically act as a separate nut locking device without the necessity of separate locking elements when the joint is assembled.

With these objects in view and such others as will be apparent from the description, the invention resides in the novel construction, combination and arrangement of parts hereinafter described and claimed, and illustrated in the accompanying drawings wherein is shown one practical, physical embodiment of the principles of the invention.

Figure 1:
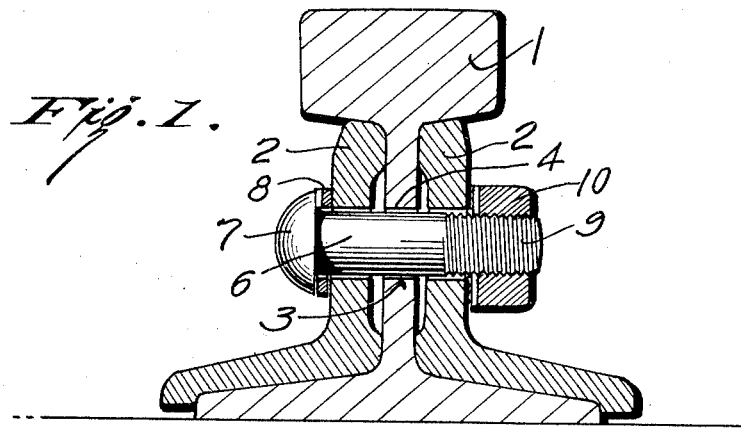
Figure 1 is a vertical section through the joint showing one of the nuts in locked position.
Figure 2:
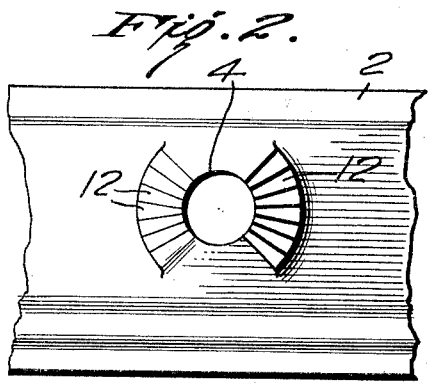
Figure 2 is a fragmentary side elevation of an angle bar.
Figure 3:
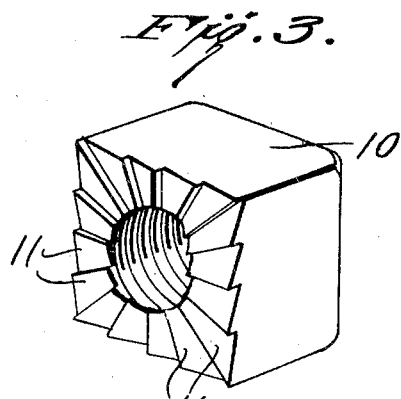
Figure 3 is a perspective view of one of the novel type of nuts employed.

In detail the invention comprises a rail joint of the usual assembly wherein abutting rails 1 are provided with a pair of angle bars 2 which engage opposite sides of the web portion 3 of the abutting rails. The angle bars are provided with the usual perforations 4 which are adapted to register with correspondingly shaped perforations in the web portions of the rail. Adapted to project through the registering perforations are bolts 6 which are provided with the usual heads 7 and conventional lock washers 8 interposed between the heads and adjacent portions of the angle bar. The free ends of the bolts are threaded as indicated at 9 and are provided with fastening nuts 10. This much of the disclosure is the usual form of rail joint and forms no particular part of our invention.

Each of the fastening nuts 10 is provided on its inner face with a series of radially extending ratchet teeth 11. Formed integrally on the portions of the angle bars that are engaged by the fastening nuts 10 are a series of upstanding reversely turned ratchet teeth 12. These ratchet teeth 12 extend radially from the bolt receiving perforation coextensive with the circumferential area of rotation of the nut and in the preferred embodiment of our invention are formed in segments, although they obviously can extend entirely around the perforation 4 and can be countersunk instead of raised. The ratchet teeth 12 on the angle bar are formed during the process of manufacturing the same and are an integral part thereof.

Figure 4:
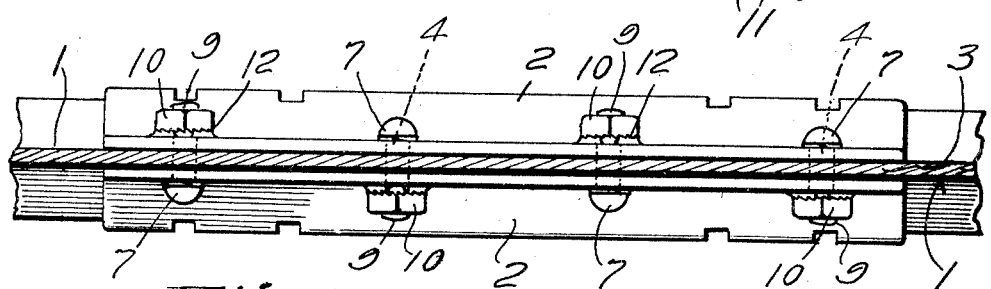
Figure 4 is a top plan view of the angle bars with the rails shown in section.

The general arrangement of the device in operative position is clearly indicated in Figure 4 and it will be seen that the bolts 6 that pass through the registering perforations in the angle bars and web portion of the rails extend in opposite directions. The ratchet teeth 12 on the angle bars are only formed adjacent the perforations through which the free end of a bolt passes. By this construction the raised ratchet teeth are only formed on the outer side of every other perforation in the angle bars.

In operation the parts are assembled in the conventional manner as clearly illustrated in Figures 1 and 4 of the drawings. When the bolts 6 are passed through aligned perforations in the angle bars and rail web, the nuts 10 are screwed on the threaded ends thereof in the usual manner. Due to the fact the inner faces of the nuts and adjacent portions of the angle bars surrounding the perforations through which the free ends of the bolts pass are each provided with reverse ratchet teeth, when the nuts engage the angle bars a cooperative interlocking engagement takes place, and this acts to automatically prevent reverse rotation of the nuts when the same are fully turned to operative position. By this construction the various parts of the rail joint construction are assembled in operative position and an automatic locking of the fastening nuts takes place without the necessity of employing additional nut locking elements. The nuts 10 by the ratchet face engagement are prevented from any reverse rotation when the parts are in interlocking relation and they cannot work off of the ends of the bolts 6. This construction forms an automatic nut locking device which is accomplished without any change in the normal method of assembling a rail joint construction of this character.

While in this preferred embodiment of the invention we have illustrated and described certain details which enter into the construction and operations thereof, we desire it to be understood that the invention is not to be limited thereby, but that any desired changes and modifications may be made in the structural details as will fall within the scope of the invention as claimed.

We claim:

A splice bar rail joint securing means comprising the combination with abutting rail ends, of splice plates disposed at opposite sides of the joint and having bolt holes for registry with bolt holes in the rail webs, bolts disposed through the bolt holes, nuts threaded on said bolt ends and formed with integral ratchet faces contacting the splice plates, the material of said plates surrounding said bolt holes being formed to provide ratchet teeth extending radially coextensive with the circumferential area of rotation of the nuts.

In testimony whereof we affix our signatures.

WALTER H. REX.
FRANK P. WOODWARD.